United States Patent Office 3,534,013
Patented Oct. 13, 1970

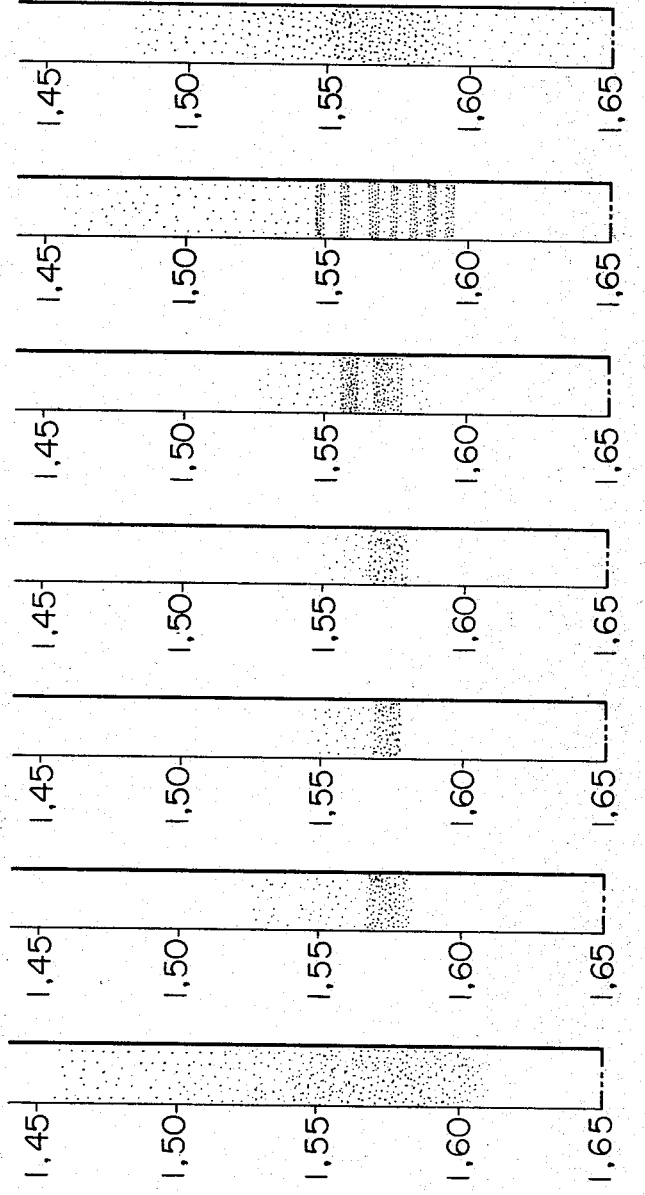

3,534,013
PROCESS FOR THE PREPARATION OF CHLORINATED POLYVINYL CHLORIDE RESIN
Toru Wakabayashi, Namerikawa-shi, Yoshio Kobayashi, Uozu-shi, and Ikuo Tujii, Kurobe-shi, Japan, assignors to Nippon Carbide Kogyo Kabushiki Kaisha, Tokyo, Japan, a corporation of Japan
Filed Oct. 30, 1967, Ser. No. 678,961
Int. Cl. C08f 27/03, 3/30
U.S. Cl. 260—92.8                                5 Claims

ABSTRACT OF THE DISCLOSURE

Improvement of the aqueous suspension type chlorination of polyvinyl chloride, characterized in that the polyvinyl chloride is produced by polymerizing vinyl chloride monomer in the copresence of a specific modifier in an amount of specified range and that chlorination is effected in the absence of a swelling agent.

---

This invention relates to a process for preparing commercially to advantage chlorinated polyvinyl chloride (hereinafter may at times be abbreviated to Cl–PVC) and, in particular, to a process for preparing Cl–PVC which has been greatly improved in such points as its superior chlorination speed, remarkable uniformity of chlorination, outstanding properties and excellence of their reproducibility, ease of elimination of the by-product hydrochloric acid from the resulting Cl–PVC and simplicity of the reaction operation.

More specifically, the invention concerns a process for preparing Cl–PVC wherein polyvinyl chloride obtained by polymerizing by means of either the suspension or emulsion polymerization method, and preferably the suspension polymerization, in the presence of at least one specific modifier, i.e., a modifier selected from the group consisting of carbon tetrachloride, 1,1,1-trichloroethane and 1,1,2-trichloroethane, is suspended in an aqueous medium in the absence of swelling agents and thereafter chlorination is effected by the introduction of chlorine gas into the foregoing suspension (hereinafter may at times be abbreviated to as aqueous suspension type chlorination).

Polyvinyl chloride (hereinafter may at times be abbreviated to PVC) is subjected to considerably numerous limitations in the field of its application due to its relatively low softening temperature. As a method to overcome the limitations and improve the low softening point of PVC, the chlorination thereof to form chlorinated polyvinyl chloride is known. As means for achieving such an end, known are such procedures as that of blowing chlorine gas into an organic solvent solution or suspension of PVC, that of contacting chlorine gas directly with a solid PVC powder, or that of blowing chlorine gas into an aqueous suspension of PVC.

This invention is directed to the preparation of Cl–PVC by the chlorination of an aqueous suspension system of PVC. Of the technical problems encountered in carrying out this particular type of Cl–PVC preparation method, the two which are of importance are the relatively low reaction rate and the difficulty in uniformly performing the reaction.

Proposals which have been made for improving the reaction rate of the aqueous suspension type chlorination method include such as that of performing the reaction under actinic light, or in the presence of oxygen, or at high chlorine gas pressure conditions.

Again, for improving the nonuniformity of the reaction, the use of swelling agents or the adoption of various other conditions in ocmbination with the above-described means has been proposed.

Another group belonging to the same company as us has previously proposed a process for preparing Cl–PVC having outstanding properties and in which the reaction speed has been improved. The proposed process is an aqueous suspension type chlorination technique which uses a starting material PVC obtained by a special polymerization method and molecular oxygen-containing chlorine which satisfies specific conditions. Namely, this process for the preparation of chlorinated polyvinyl chloride is characterized by the use of PVC powder obtained from a polymerization process performed in the absence of emulsifiers but in an aqueous medium which does not substantially dissolve vinyl chloride monomer nor appreciably swells or deforms the polymer formed, in the presence of a polymerization catalyst which is insoluble in the monomer but is soluble in the medium, said PVC powder being composed of agglomerates of spherical primary particles of 0.1–5 microns in diameter and at least 70% by weight thereof having diameters no less than 40 microns; and comprises the steps of suspending the said PVC powder in water or hydrochloric acid, feeding chlorine and oxygen into the suspension under such conditions that the rate of oxygen supply is less than 0.05 liter/hr./ kg.-PVC but no less than 0.01 liter/hr./kg.-PVC, preferably 0.02–0.04 liter/hr./kg., and that the oxygen concentration in the chlorine gas is 0.05–0.35% by volume, preferably 0.1–0.3% by volume, thereby contacting the chlorine with the said PVC powder in the suspension, in the absence of swelling agents, at temperature ranging 55°–80° C.

As a result of our investigations with a view to finding a process for preparing Cl–PVC which excels in such respects as chlorination speed, uniformity of chlorination, reproducibility of quality, ease of removal of the by-product hydrochloric acid, and the quality of the resulting product, and in which the operation is still more easily performed, we found that Cl–PVC excelling in the hereinabove enumerated respects and whose operation of preparation was simple could be produced by using, as the starting material, PVC obtained by the suspension or emulsion polymerization method in the presence of the previously indicated specific modifier and thereafter effecting the aqueous suspension type chlorination in the absence of swelling agents, without the requirement for numerous precautions in carrying out the operation or the necessity of such supplementary conditions as actinic light radiation, swelling agents and pressure, as hereinbefore noted.

As hereinafter fully described by the presentation of comparisons, the objects of this invention cannot be achieved even though the aforesaid specific modifier is added during the chlorination step. Further, neither can the objects of the invention be achieved by adding during the chlorination step as a substitute for the modifier of this invention the swelling agents, such as, say chloroform, trichloromethane and dichloromethane, which have hitherto been known to be useful in improving the chlorination speed by their swelling action. Again, it was also found that the objects of this invention could not be achieved even though such compounds as trichloroethylene and tetrachloroethylene, which are usually utilized as polymerization regulators of PVC, are substituted for the modifier that is utilized in this invention.

As to a process for preparing Cl–PVC in which the aqueous suspension type chlorination is carried out under the conditions of actinic light radiation, the proposal wherein said step is carried out in a suspension containing about 5 to 25% by volume, based on the aqueous medium (at least 50% by weight based on the material PVC), of a chlorohydrocarbon selected from the class consisting of monochloromethane, dichloromethane and chloroform, which functions as a swelling agent for the suspended PVC is known. And, it is known that if carbon tetrachloride is used instead of the aforesaid chloroform the color, softening point and stability of the resulting Cl-PVC has been shown experimentally to be inferior. It was however surprising to find that remarkably excellent chlorination effects could be had by using as the material PVC one polymerized in the presence of carbon tetrachloride and by carrying out the chlorination step in the absence of a swelling agent but, on the other hand, to find that only unsatisfactory results could be obtained if chloroform was used instead of carbon tetrachloride in this case. This was equally so in the case also of monochloromethane and dichloromethane.

It is therefor an object of this invention to provide a process for preparing Cl-PVC wherein the various supplemental conditions and limitations have been overcome and the uniform performance of the chlorination at a high chlorination speed with exceedingly simple operations has been made possible whereby the production of Cl-PVC having excellent properties can be carried out with good reproducibility.

Other objects and advantages of the invention will be apparent from the following description.

The material PVC to be used in this invention is one which has been polymerized in the presence of a specific modifier. The polymerization reaction is carried out by either of the known polymerization methods of suspension or emulsion polymerization, but the former is to be preferred.

The modifier used is selected from the group consisting of carbon tetrachloride, 1,1,1-trichloroethane and 1,1,2-trichloroethane. These modifiers which are used in preparing the material PVC are used in a smallest possible amount. An amount usually on the order of 0.1–10% by weight based on the vinyl chloride monomer will do. The preferred amount is on the order of 0.5–7% by weight, and particularly 1–5% by weight. The use of the modifier in such a large amount that it can substantially act as a swelling agent, i.e. in amounts such as to be a swelling agent of the resulting PVC, is not desirable.

Although there are no limitations as to the period in which the modifier is added to and caused to be present in the polymerization system, it is preferably added and caused to be present in the system prior to the start of the polymerization reaction or in its early stage. If desired, the addition may be made in several increments.

The material PVC to be used in the preparation of the Cl-PVC of this invention can be obtained by either the suspension or emulsion method of polymerization can be used, but the suspension polymerization method is to be preferred. The polymerization can be effectively carried out in an aqueous medium, using the usually known radical polymerization initiators, such as azobisisobutyronitrile or peroxides, at a polymerization system temperature on the order of, say, room temperature to 70° C.

In the suspension polymerization method, the polymerization reaction is carried out, for example, by charging the polymerization vessel with water, the vinyl chloride monomer, a modifier and a dispersing agent, after which the system is stirred in the presence of a polymerization initiator. The dispersing agent, which is used as a suspension stabilizer, is usually used in an amount of 0.05–0.5% by weight based on the total amount of liquid in the polymerization system. Examples of the well-known dispersing agent includes such as polyvinyl alcohol, polyvinyl methyl ether etc. In the case of the emulsion polymerization method, the polymerization is carried out while maintaining the vinyl chloride monomer in water in an emulsified state by the presence of an emulsifier in the polymerization system. As the emulsifier, any of the known anionic, cationic and nonionic surface active agents can be used, but the anionic and nonionic types are to be preferred. These can, of course, be used either alone or as a mixture.

The resulting material PVC is isolated from the polymerization system in customary manner and, after removing the modifier as promptly as possible, it is transferred to the following chlorination step. Although it is usually used dried after having removing the modifier it can also be used in the state of a filter disc. Hence, the terminology "in the absence of swelling agent," as herein used, should be understood as not excluding the instance of the utilization of the material PVC in its filter cake state. Needless to say, such a minute amount cannot function as a swelling agent in the aqueous suspension system.

There are no particular restrictions in carrying out the chlorination step, except that it is carried out in the absence of swelling agents. It can be carried out very easily at a high chlorination speed following the known aqueous suspension type chlorination methods.

If desired, the conjoint use can be made of the actinic light radiation technique, or the chlorination can be carried out under superatmospheric pressure conditions, or the conjoint use can be made of the method in which oxygen is caused to be present. These methods however need not necessarily be used.

The Cl-PVC obtained by the invention process demonstrates a heat stability of usually not less than 170 minutes of the blackening time of the moulded sample and, as hereinafter described in detail, a product is obtained in which the density distribution range of the Cl-PVC particles obtained is very narrow and the uniformity of the chlorination is exceedingly high. The product possesses not only excellent properties, but also the reproducibility of the properties is outstanding.

Further, the removal of the hydrochloric acid, which is inevitably formed as a by-product and which, if contained in the resulting Cl-PVC, aggravates the thermal stability of the product by becoming the cause of the thermal decomposition of the resin during its moulding, becomes very easy. This makes the invention process commercially of great advantage.

The chlorination step is preferably carried out under normal atmospheric pressure. On the other hand, a chlorination temperature of less than 80° C., and usually on the order of room temperature to 80° C., as usually used, can be employed. A temperature on the order of 60–78° C. is suitable in the invention process from the commercial standpoint, but a still lower temperature can be used, if desired.

The following examples along with comparisons will be given to illustrate several modes of practicing the invention, it being understood that the invention can be modified in various manner in its practice without departing from the scope of the appended claims.

Before presenting the examples and comparisons, the method used in preparing the samples for testing the properties of the Cl-PVC obtained in the examples and comparisons as well as the testing methods used will be described.

(I) COMPOSITION OF SAMPLES AND THE PREPARATION OF THE ROLLED SHEET (1) Formulation

| | Parts by weight |
|---|---|
| Cl-PVC | 100 |
| Tribasic sulfate | 3.0 |
| Dibasic lead stearate | 2.0 |
| Higher alcohol (tradename Calcohol 86 (mixture mainly of $C_{16}$–$C_{18}$ alcohols) product of Kao Soap Company, Japan) | 1.0 |
| Organic tin stabilizer | 1.0 |
| Ethylene/vinyl acetate copolymer | 5.0 |

(2) Preparation

The above composition was mixed by means of an Ishikawa-type blender (product of Ishikawa Kojo Mfg.

Co., Ltd., Tokyo Japan) at 120° C. for 20 minutes. The resultant mixture was kneaded by means of 175° C. mixing rolls of 6 inch diameter for 15 minutes to be made into a sheet 0.5 mm. in thickness.

(II) PROPERTY TESTS

(1) Penetration temperature under heating (1.1) Preparation of sample.—The sheet obtained in item (I) 2 was hot pressed for 10 minutes under the moulding temperature and pressure conditions of 190° C. and 35 kg./cm.² (gauge pressure), and the resultant plate was cut to the standard size of JIS K 6742 (15 mm. in length, 10 mm. in width and 2 mm. in thickness) to serve as the test sample.

(1.2) Testing procedure.—Under the operations as specified in JIS K 6742 excepting the initial heating temperature of the metal die was 90° C., the penetration temperature under heating was read. In the hereinafter given tables, the difference (° C.) of the increase (+) and decrease (−) of the several samples with respect to the control has been given.

(2) Tensile strength (2.1) Preparation of sample.—The sheet obtained in item (I) 2 was hot pressed for 10 minutes under the moulding temperature and pressure conditions of 190° C. and 35 kg./cm.² (gauge pressure), and the resultant plate was cut to the standard size of JIS K 6745 to serve as the test sample.

(2.2) Testing procedure.—Operating in exactly the same manner as described in JIS K 6745, the obtained values were expressed in kg./cm.². The measurement was carried out at 25° C.

(3) Elongation (3.1) Preparation of sample.—The sheet obtained in item (I) 2 was hot pressed for 10 minutes under the moulding temperature and pressure conditions of 190° C. and 35 kg./cm.² (gauge pressure), and the resultant plate was cut to the standard size of JIS K 6745 to serve as the test sample.

(3.2) Testing procedure.—The sample of 3.1 was tested for its tensile strength in accordance with JIS K 6745. The distance between the reference marks is measured when the sample has been severed. Letting the initial distance between the reference marks be $lo$ and the distance between the marks at the time of severance be $l$, the elongation is then calculated by means of the following equation.

$$\text{elongation (percent)} = \{(l-lo)/lo\} \times 100$$

(4) Impact strength (4.1) Preparation of sample.—The sample is prepared in accordance with DIN 53453. The test piece obtained in 1.1 provided at one side with a V notch of 45° angle and 0.6 mm. depth at a position 5.5 mm. from one end of the piece in the longitudinal direction was employed.

(4.2) Testing procedure (in accordance with DIN 53453)

(1) Measuring machine:
Dynstat tester produced by Karl Frank GMBH (Germany).
(2) Measuring conditions:
Length of pendulum—25 cm.
Swing-up angle—60°.
Impact energy—5 kg. cm. (small size weight was used)
Impact distance—7 mm.
Measuring temperature—25° C.
(3) Measured values:
The numerical value obtained by dividing the energy (kg.-cm.) required for destruction of the test piece obtained under the above conditions, by the area corresponding to the remaining thickness of the notched portion was made the measured value (kg./cm./cm.²).

(5) Blackening time (5.1) Preparation of sample.—To serve as the test sample, a piece about 5 x 7 cm. in size was cut off from a sheet obtained as in (I) 2.

(5.2) Testing procedure.—The sample was heated in a gear oven of 190±2° C., and the time (minutes) required for its blackening was measured.

(6) Purification of the resulting Cl–PVC

About 3 kg. of a filter cake of Cl–PVC were placed in a stirrer-equipped polyethylene vessel, after which about 17 kg. of room temperature deionized water were added so as to obtain a 15% slurry. After stirring this slurry for 8 minutes at 200 r.p.m., it was filtered. About 10 cc. of the filtrate were placed in a test tube, and, after adding 2–3 drops of a silver nitrate solution (about 1 mol/liter), the residual Cl ions were determined. The foregoing washing operation was repeated until turbidity resulting from silver nitrate could no longer be observed, and the number of this repetition was designated as the number of washings.

EXAMPLES 1–8 AND COMPARISONS 1–13

The polymerization of the material PVC was carried out in a turbine bladed stirred-equipped 300-liter autoclave. The polymerization reaction was carried out by the customary suspension polymerization method to a degree of polymerization of 1050±50 by charging the autoclave, whose stirrer was operated at 300 r.p.m., with vinyl chloride monomer and water in the amounts of 60 kg. and 120 kg., respectively, and using lauryl peroxide as the polymerization initiator and 4.8 kg. of polyvinyl alcohol. 13–20 hours was required for the polymerization. The polymerization temperature and amount of the initator were suitably chosen in accordance with the class of the modifier, amount and the degree of polymerization intended, as hereinabove noted. Further, the polymerization reaction stopped at the point where the polymerization yield was about 85%. The so obtained PVC was dried with hot air and then delivered to the following chlorination step.

The chlorination reaction was carried out using a 200-liter reaction vessel equipped with a stirrer. A stirrer rotation of 200 r.p.m. was used, and the amounts of PVC and water charged were 27 kg. and 153 kg., respectively. After the charging of the PVC and water was completed, the temperature was raised to a reaction temperature of 73° C. while purging the vessel for 2 hours with nitrogen gas at the rate of 2 cubic meters per hour. This was followed by feeding chlorine gas at the rate of 2 cubic meters per hour for one hour and thereafter at the rate of 0.8 cubic meter per hour. The hydrochloric acid concentration of the reaction solution was measured, and at the point where the chlorine content of the Cl–PVC became about 66.5% the feeding of the chlorine gas was stopped. This was immediately followed by purging the reaction vessel with nitrogen gas at the rate of 2 cubic meters per hour. While carrying out the purging for 2 hours, the temperature inside the reaction vessel was cooled to room temperature. The resulting Cl–PVC was washed and dried until its volatile portion was less than 0.5%. Thus, the several product Cl–PVC's were obtained. The chlorine used was that contained in a bomb, and before its use the trace of oxygen contained in the chlorine was purged, after which 0.1% by volume of oxygen was mixed therein.

In Table 1, below, are shown the results obtained in those instances in which the class and amount used of the modifier was varied, those instance in which, by way of comparison, chloroform, dichloromethane, trichloroethylene, tetrachloroethylene and ethylene dichloride were used instead of the modifier as used in this invention and those instances in which the invention modifier was used in the chlorination step. The results obtained in the case of a control in which these additives were not added are also shown. The property values of the Cl–PVC are in all cases the average of four tests.

improvement when used instead of the modifiers, which are used in this invention. Further, it can likewise be seen that even though trichloroethylene, tetrachloroethylene and ethylene dichloride, which have not more than 2 carbon atoms and not less than 2 chlorine atoms, are

TABLE I

| Experiment No. | Material PVC — Modifier (percent by weight based on PVC monomer) | Chlorination step — Swelling agent (percent by weight based on PVC monomer) | Chlorination reaction time — Time required to attain a chlorine content of about 66.5 hr. | Purification of resulting Cl–PVC — Number of washing required for removal of by-product hydrochloric acid |
|---|---|---|---|---|
| Control | | | 15¼ | 8 |
| Example 1 | Carbon tetrachloride (1) | | 8⅓ | 6 |
| Example 2 | Carbon tetrachloride (3) | | 7 | 5 |
| Example 3 | Carbon tetrachloride (5) | | 6½ | 4 |
| Example 4 | Carbon tetrachloride (7) | | 6½ | 5 |
| Comparison 1 | | Carbon tetrachloride (3) | 14 | 11 |
| Comparison 2 | | Carbon tetrachloride (5) | 20 | 13 |
| Example 5 | 1,1,1-trichloroethane (2) | | 8¾ | 6 |
| Example 6 | 1,1,1-trichloroethane (4) | | 8¼ | 6 |
| Comparison 3 | | 1,1,1-trichloroethane (2) | 14½ | 10 |
| Comparison 4 | | 1,1,1-trichloroethane (4) | 15¾ | 10 |
| Example 7 | 1,1,2-trichloroethane (2) | | 8¾ | 6 |
| Example 8 | 1,1,2-trichloroethane (4) | | 7 | 5 |
| Comparison 5 | | 1,1,2-trichloroethane (2) | 14¾ | 11 |
| Comparison 6 | | 1,1,2-trichloroethane (4) | 16⅓ | 12 |
| Comparison 7 | Chloroform (2) | | 14 | 12 |
| Comparison 8 | Chloroform (4) | | 13½ | 9 |
| Comparison 9 | Dichloromethane (2) | | 13⅙ | 10 |
| Comparison 10 | Dichloromethane (4) | | 14¼ | 10 |
| Comparison 11 | Trichloroethylene (2) | | 15½ | 10 |
| Comparison 12 | Tetrachloroethylene (2) | | 12 | 11 |
| Comparison 13 | Ethylene dichloride (3) | | 16½ | Above 12 |

| | Cl–PVC | | | | | |
|---|---|---|---|---|---|---|
| Experiment No. | Chlorine contents (percent by weight) | Penetration temperature under heating [increase (+) or decrease (−) based on control] (° C.) | Tensile strength [increase (+) or decrease (−) based on control] (kg./cm.²) | Impact strength [increase (×) based on control] (kg.-cm./cm.²) | Blackening time [increase (+) based on control] (minutes) | Elongation [increase (+) or decrease (−) based on control] (percent) |
| Control | 66.5 | ¹0 | ²0 | ³0 | 120 (0) | 0 (57%) |
| Example 1 | 66.5 | +5 | +10 | +1.3 | 180 (+60) | +24 |
| Example 2 | 66.7 | +4 | +21 | +4.3 | 190 (+70) | +13 |
| Example 3 | 66.7 | +5 | +20 | +4.8 | 190 (+70) | +12 |
| Example 4 | 66.7 | +3 | +17 | +4.9 | 190 (+70) | +10 |
| Comparison 1 | 66.4 | 0 | −2 | +0.5 | 130 (+10) | +2 |
| Comparison 2 | 66.4 | −4 | 0 | +0.4 | 120 (0) | −28 |
| Example 5 | 66.7 | +4 | +10 | +1.5 | 180 (+60) | +10 |
| Example 6 | 66.4 | +3 | +18 | +3.0 | 190 (+70) | +9 |
| Comparison 3 | 66.4 | 0 | −2 | 0 | 120 (0) | −17 |
| Comparison 4 | 66.7 | +1 | −1 | 0 | 130 (+10) | −32 |
| Example 7 | 66.4 | +4 | +14 | +3.2 | 180 (+60) | +47 |
| Example 8 | 66.7 | +4 | +10 | +1.5 | 190 (+70) | +12 |
| Comparison 5 | 66.4 | 0 | −4 | +0.2 | 120 (0) | −6 |
| Comparison 6 | 66.5 | 0 | −2 | 0 | 130 (+10) | −10 |
| Comparison 7 | 66.4 | −1 | +2 | +0.6 | 130 (+10) | +3 |
| Comparison 8 | 66.4 | +1 | −9 | +0.5 | 140 (+20) | 0 |
| Comparison 9 | 66.6 | 0 | −23 | +0.4 | 130 (+10) | −14 |
| Comparison 10 | 66.4 | 0 | −17 | +0.5 | 130 (+10) | −21 |
| Comparison 11 | 66.4 | −1 | −2 | 0 | 140 (+20) | +1 |
| Comparison 12 | 66.6 | 0 | −5 | 0 | 120 (0) | −5 |
| Comparison 13 | 66.4 | −1 | −10 | +0.4 | 130 (+10) | −10 |

¹ (112° C.).
² (602 kg./cm.²).
³ (2.9 kg.-cm./cm.²).

It can be seen from the results presented in Table 1, above, that in the case of the examples according to this invention the chlorination reaction time required to obtain a chlorine content of about 66.5% under identical conditions ranged from a minimum of 6½ hours to a period of time on the order of 8¾ hours in the longest case whereas that for the control was 15¼ hours. Thus, the chlorination reaction time is reduced to about one half or even less. On the other hand, even though these modifiers, which are used in this invention, are utilized in the chlorination step, no substantial shortening of the chlorination reaction time is observed. Rather, it can be seen that the chlorination is impeded instead to result in prolonging the chlorination time. Further, chloroform and dichloromethane, which were hitherto held to be useful in promoting the chlorination reaction when used in swelling agent amounts under the supplemental conditions of light or pressure, likewise brought about substantially no used instead of the invention modifiers no substantial improvement is demonstrated but instead adverse effects are brought about at times.

On the other hand, it is apparent from the results presented in Table 1 that the properties of the Cl–PVC obtained by this invention are outstanding. First of all, the results of the blackening time test should be noted. Cl–PVC having a measurement value of above 150 in this test has excellent heat resistance. Particularly, when this value is above 180, the Cl–PVC, whose moldability is poor, can fully withstand the rigors of degradation and discoloration resulting from the elevated temperature and high shearing stress that it is subjected to under moulding conditions to yield a moulded product for excelling that of the conventional products. As is apparent from the results of these experiments, in the case of the Cl–PVC obtained according to the invention examples, the blackening times was above 180, there being demonstrated an increase of 60–70 minutes over that of the control, i.e., a rate of increase of above about 50%. In contradistinction, in the case of the previously noted numerous comparisons, there was no substantial improvement demonstrated. And even though there was an improvement, it was 20 minutes at most, i.e. on the order af about 17%. Moreover, only those on the order of less than 150 minutes could be obtained.

Further, a tendency to an improvement over the control and the Comparisons was also noted in the case of the penetration temperature under heating. In the case of the tensile strength, an increase of 10–21 kg./cm.$^2$, as compared with the control, is observed. In contradistinction, it can be seen that, in the case of the comparisons, there was not seen any substantial improvement, but rather there were instances in which a considerable decrease in tensile strength was brought about. This was also true in the case of impact strength and elongation. Thus, it can be seen that the Cl–PVC obtained by the invention process is outstandingly superior with respect to a great number of properties including heat resistances.

Next, the density distribution of the Cl–PVC obtained by the invention process and that obtained by the process of the Comparisons will be explained by means of the accompanying drawings. The density of the material PVC is usually narrow. However, that of the Cl–PVC which has been obtained by chlorination of the material PVC usually becomes considerably broad. This is an indication that the chlorination has not proceeded uniformly. According to the invention process, however, the density distribution is very narrow and this indicates that the chlorination has proceeded exceedingly uniformly. Thus, since the reproducibility of the excellent properties of the resulting Cl–PVC is very good, Cl–PVC of uniform grade is provided.

The accompanying drawings FIGS. 1–7 show the results of the density distribution test. The measurement was conducted using, as the test specific gravity liquids (light and heavy liquids), petroleum benzine, carbon tetrachloride and bromoform, and introducing these liquids suitably into the gradient tube in such a manner as to form the desired density gradient. A density gradient distribution measuring apparatus manufactured by the Shibayama Kagaku Kikai Seisakusho, Tokyo, Japan was used as the measuring instrument, and the test was conducted in accordance with the method of measurement described in the Journal of the Chemical Society of Japan, Industrial Chemistry Section, published by the Japan Chemical Society, vol. 64, pp. 2053–2057 (1961). FIGS. 1, 2, 3, 4, 5, 6 and 7 represent the results of the distribution tests of the Cl–PVC's of the control and Examples 2, 3, 5 and 7 and Comparisons 2 and 11, respectively, of Table 1, in the form of a side view (on a reduced scale) corresponding to the state of distribution in the actual tube.

In the figures, the black dots represent the Cl–PVC particles, and the numerical values indicated along the lengthwise direction of the tube represent the density of the test specific gravity liquid of that portion.

As shown in the drawings of FIGS. 2–5, the density distribution range of the Cl–PVC obtained by the invention process is exceedingly narrow. This denotes that the degree of chlorination of the Cl–PVC particles obtained is very uniform. In contrast, the density distribution of the Cl–PVC obtained by the control of FIG. 1 is exceedingly broad, which denotes that the degree of chlorination of the Cl–PVC particles obtained is nonuniform.

Again, in FIG. 6 are shown the results obtained in the case of the Cl–PVC of comparison 2, which is in opposite relation to Example 3 of FIG. 3. As apparent from these results, it is seen that only Cl–PVC particles in which the degree of chlorination is exceedingly nonuniform can be obtained even though the modifier in Example 3 is used in the chlorination step under entirely identical conditions.

TABLE 2

| | | | Chlorination conditions | | | Purification of resulting Cl–PVC | | Cl–PVC | |
|---|---|---|---|---|---|---|---|---|---|
| | Modifier (percent by weight based on the monomer) | Catalyst (percent by weight based on the monomer) | Polymerization method | Temp., °C. | Pressure, mm. Hg. | Chlorine | Chlorination time — Time required for chlorine content to attain about 67%, hr. | Number of times washing required to remove the by-product hydrochloric acid | Chlorine content, percent | Blackening time, minutes |
| Example: | | | | | | | | | | |
| 9 | Carbon tetrachloride (9) | Laurylperoxide (0.8) | Suspension | 70 | Normal atom | [1] | 6 | 5 | 67.1 | 180 |
| 10 | Carbon tetrachloride (0.5) | Laurylperoxide (0.1) | do | 75 | do | [2] | 9 | 7 | 67.7 | 180 |
| 11 | Carbon tetrachloride (4) | Laurylperoxide (0.4) | do | 68 | do | [2] | 6¾ | 4 | 67.0 | 200 |
| 12 | Carbon tetrachloride (1.5) | Laurylperoxide (0.2) | do | 70 | do | [1] | 7½ | 6 | 66.9 | 190 |
| 13 | 1,1,1-trichloroethane (1.5) | Laurylperoxide (0.3) | Suspension | 73 | 795 | [2] Mercury lamp radiation [3] | 7½ | 5 | 66.8 | 180 |
| 14 | 1,1,1-trichloroethane (3) | Laurylperoxide (0.2) | do | 65 | Normal atom | do [3] | 7¾ | 6 | 66.9 | 190 |
| 15 | do | Laurylperoxide (0.3) | do | 65 | do | do [3] | 6½ | 4 | 67.0 | 210 |
| 16 | Carbon tetrachloride (3.5) | Laurylperoxide (0.4) | do | 70 | do | [2] | 9 | 5 | 68.5 | 200 |
| 17 | Carbon tetrachloride (3) | Potassium persulfate (0.1) | Emulsion [4] | 70 | do | [2] | 6 | 6 | 67.0 | 170 |

[1] Commercial electrolytic chlorine containing 0.2% by volume of molecular oxygen was used.
[2] Chlorine as used in Example 1 was used.
[3] Liquified chlorine (contained in bomb) which was left after purging the initial gaseous portion was used.
[4] As the emulsifier, sodium salts of higher fatty acids (0.6 part by weight per 100 part by weight of the monomer) were used.

Further, the results obtained in the case of Comparison 11 are shown in FIG. 7. These results are similar to those obtained in the case of the control, and hence it can be seen that the objects of this invention cannot possibly be attained in this case.

Although the results obtained in the case of Comparisons 3, 5 and the other comparison have not been shown in the drawings, results which do not differ greatly from those of the comparisons hereinabove described could only be obtained in these cases also.

EXAMPLES 9–17

The invention process was practiced, varying the modifier, catalyst, polymerization method and chlorination conditions. The results obtained are shown in Table 2, below. It goes without saying that swelling agents were not used at all in the chlorination step.

We claim:

1. In a process for preparing chlorinated polyvinyl chloride wherein polyvinyl chloride is obtained by polymerizing a vinyl chloride monomer by suspension or emulsion polymerization methods in the presence of from about 0.1 to 10% by weight based on said vinyl chloride monomer of a modifier selected from the group consisting of carbon tetrachloride, 1,1,1-trichloroethane and 1,1,2-trichloroethane the improvement comprising effecting aqueous suspension type chlorination of said polyvinyl chloride without the further addition of swelling agents.

2. The process according to claim 1 wherein said modifier is present in an amount ranging between 0.5 percent and 7 percent by weight.

3. The process according to claim 1 wherein said modifier present in an amount ranging between 1 percent and 5 percent by weight.

4. The process according to claim 1 wherein said chlorination is effected at a temperature not exceeding 80° C.

5. The process according to claim 1 which is characterized in that the density distribution range of the resulting chlorinated polyvinyl chloride is exceedingly narrow and its blackening time is above 170 minutes.

References Cited

UNITED STATES PATENTS 2,996,489  8/1961  Dannis et al.

JOSEPH L. SCHOFER, Primary Examiner

J. A. DONAHUE, JR., Assistant Examiner